(12) United States Patent
Hatano (10) Patent No.: US 8,328,297 B2
(45) Date of Patent: Dec. 11, 2012

(54) BRAKE SYSTEM

(75) Inventor: Kunimichi Hatano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 981 days.

(21) Appl. No.: 11/805,416

(22) Filed: May 22, 2007

(65) Prior Publication Data

US 2007/0278855 A1 Dec. 6, 2007

(30) Foreign Application Priority Data

Jun. 6, 2006 (JP) ................................. 2006-157460
Oct. 20, 2006 (JP) ................................. 2006-285647

(51) Int. Cl.
*B60T 8/42* (2006.01)

(52) U.S. Cl. ............... 303/115.1; 303/122.3; 303/122.4; 303/122.5; 303/114.1; 303/113.4

(58) Field of Classification Search .. 303/122.03–122.5, 303/114.1, 113.4, 115.1
See application file for complete search history.

(56) References Cited

U.S. PATENT DOCUMENTS

| 4,728,155 | A * | 3/1988 | Resch ........................ 303/114.1 |
| 6,604,795 | B2 | 8/2003 | Isono et al. |
| 6,688,706 | B2 * | 2/2004 | Chang ........................ 303/115.4 |
| 7,488,047 | B2 | 2/2009 | Hatano et al. |
| 2002/0084693 | A1 * | 7/2002 | Isono et al. ................. 303/113.1 |
| 2003/0038541 | A1 * | 2/2003 | Suzuki et al. ................ 303/155 |
| 2005/0104443 | A1 | 5/2005 | Kusano |
| 2006/0091726 | A1 * | 5/2006 | Hatano et al. ............. 303/122.13 |

FOREIGN PATENT DOCUMENTS

| DE | 601 21 714 T2 | 7/2007 |
| EP | 1 219 516 B1 | 7/2006 |
| JP | 2002-211386 | 7/2002 |
| JP | 2003-137084 | 5/2003 |
| JP | 2005-145280 A | 6/2005 |
| JP | 2006-056449 | 3/2006 |
| JP | 2006-111190 | 4/2006 |

OTHER PUBLICATIONS

"Electrohydraulic Brake System", from the website "Wikipedia", the free encyclopaedia, 1 of 3 pages, from: "http://de.wikipedia.org/wiki/Elektrohydraulische_Bremse". "Brake System", from the website "Wikipedia", 1 of 4/5 pages from: "http://wiki.priusforum.de/wiki/Bremse".
Pages from Bosch's Handbook, pp. 806/807 Master Cylinder, p. 815 ABS version (as at 2003), exerpt from pp. 836/837; (Oct. 25, 2003 edition).

* cited by examiner

*Primary Examiner* — Bradley King
*Assistant Examiner* — Mahbubur Rashid
(74) *Attorney, Agent, or Firm* — Carrier Blackman & Associates, P.C.; William D. Blackman; Joseph P. Carrier (57) ABSTRACT

In a brake system, two first fluid pressure chambers of a master cylinder respectively communicate with two second fluid pressure chambers of a motor cylinder. The two second chambers communicate with four wheel cylinders through an ABS. The wheel cylinders are operated by brake fluid pressure generated by the master cylinder in an abnormal situation where the motor cylinder is non-operational. The brake system includes two separate independent fluid pressure lines: one line extending from one of the first chambers in the master cylinder to the wheel cylinders via one of the second chambers in the motor cylinder; and the other line extending from the other first chamber in the master cylinder to the wheel cylinders via the other second chamber in the motor cylinder. Thus, even if an abnormality occurs in one of the two fluid pressure lines, a minimum necessary braking force is secured.

10 Claims, 7 Drawing Sheets

FIG.1

NORMAL OPERATION

FIG.2

ABNORMAL OPERATION

BRAKE SYSTEM

CROSS-REFERENCE TO RELATED APPLICATIONS

The present invention claims priority under 35 USC 119 based on Japanese patent application No. 2006-157460, filed on June 6, 2006, and Japanese patent application No. 2006-285647, filed on Oct. 20, 2006. The entirety of the subject matter of each of these priority documents is incorporated by reference herein.

BACKGROUND OF THE INVENTION

1. Field of the Invention

The present invention relates to a brake system having a master cylinder for generating brake fluid pressure based on a brake operation of a driver, and an electrical fluid pressure generation device for generating brake fluid pressure by an electrically controllable actuator.

2. Description of the Related Art

Japanese Patent Application Laid-open No. 2003-137084 discloses a brake system of the type referred to as a brake by wire (BBW) brake system, which converts a brake operation of a driver into an electrical signal used to operate electrical fluid pressure generation device, and operates a wheel cylinder by brake fluid pressure generated by the electrical fluid pressure generation device.

Figure 7:
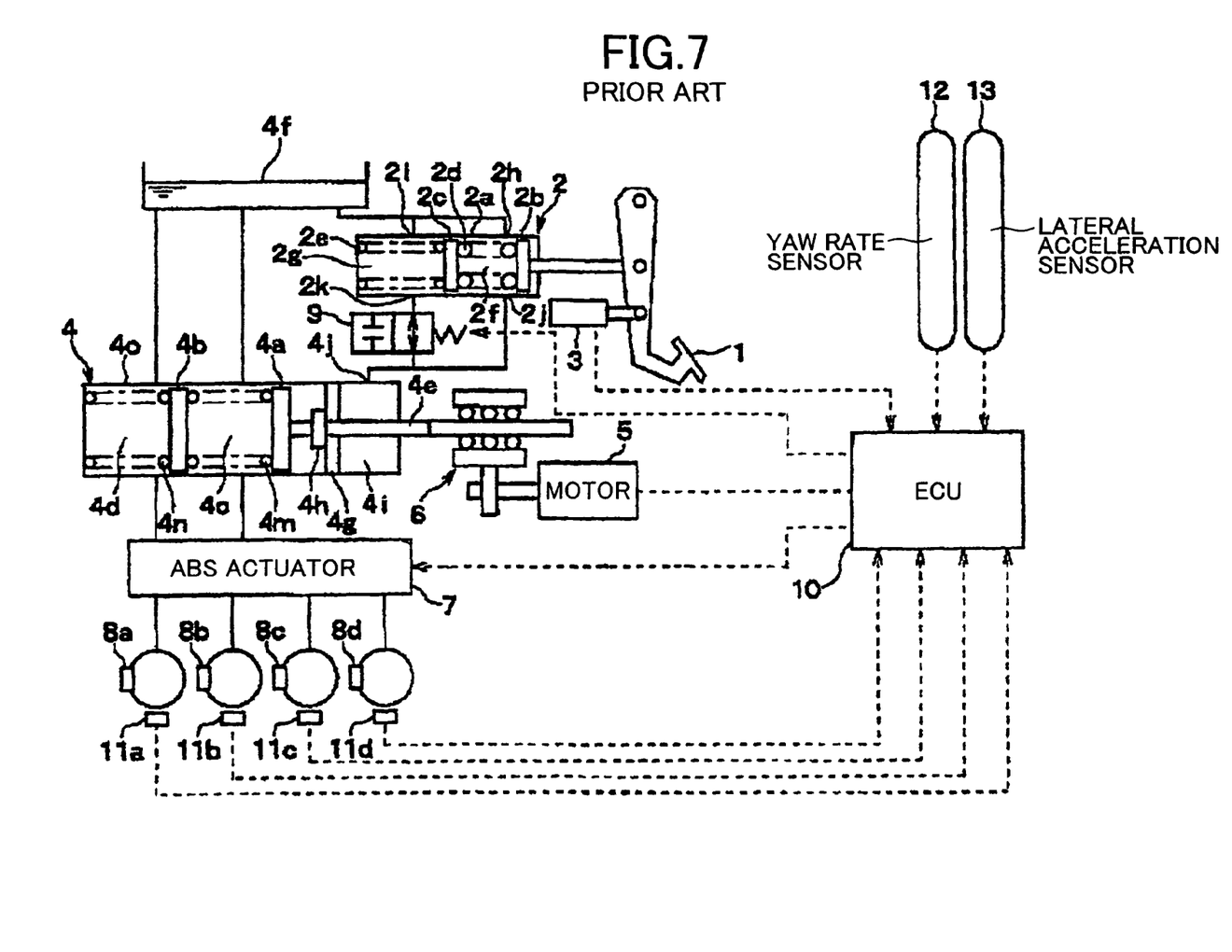
FIG. 7 is a diagram of a prior art BBW system.

As seen in FIG. 7, which is a reproduction of FIG. 1 of Japanese Patent Application Laid-open No. 2003-137084, the known BBW brake system is constituted by connecting in series a fail-safe cylinder 2 operated through a brake pedal 1 to generate a brake fluid pressure, a master cylinder 4 operated by a motor 5 to generate brake fluid pressure, an anti-lock brake system (ABS) actuator 7 having a function of reducing, maintaining and increasing brake fluid pressure with respect to each vehicle wheel, and four wheel cylinders 8a to 8d. In a normal situation where the motor 5 can operate, the wheel cylinders 8a to 8d are operated by the brake fluid pressure generated by the master cylinder 4 to generate brake fluid pressure. In an abnormal situation where the motor 5 cannot operate, the master cylinder 4 is operated by the brake fluid pressure generated by the fail-safe cylinder 2 to generate brake fluid pressure.

The master cylinder 4 comprises first and second pistons 4a and 4b, first and second chambers 4c and 4d defined in front of the first and second pistons 4a and 4b, a piston rod 4e connected to the first piston 4a on the rear side and extending rearward, a fail-safe piston 4g slidably fitted to the rear part of a flange portion 4h provided on the piston rod 4e, and an on-fail pressurization chamber 4j which is defined in the rear of the fail-safe piston 4g and pressurized at the event of failure. A second chamber 2g of the fail-safe cylinder 2 communicates with the on-fail pressurization chamber 4j through a fail-safe valve 9.

When the fail-safe valve 9 is opened in a situation where the motor 5 for the master cylinder 4 becomes unable to operate due to power failure or the like, fluid pressure generated in the second chamber 2g of the fail-safe cylinder 2 is supplied to the on-fail pressurization chamber 4j via the fail-safe valve 9 to advance the fail-safe piston 4g, and thus the first and second pistons 4a and 4b advance together with the piston rod 4e having the flange portion 4h engaged with the fail-safe piston 4g, thereby generating brake fluid pressure in the first and second chambers 4c and 4d to exert a fail-safe function.

However, in the system described in Japanese Patent Application Laid-open No. 2003-137084, the fail-safe cylinder 2 and the master cylinder 4 communicate with each other substantially through only one fluid passage (the fluid passage in which the fail-safe valve 9 is provided). Therefore, there is a fear of complete failure of the fail-safe function if drainage or clogging occurs in the fluid passage, disadvantageously leading to a need for countermeasures such as preparation of a backup power source.

SUMMARY OF THE INVENTION

The present invention has been achieved in view of the above described circumstances, and has as an object to provide a BBW brake system having an improved fail-safe function in an abnormal situation.

In order to achieve the above object, according to a first feature of the present invention, there is provided a brake system comprising a master cylinder having two first fluid pressure chambers which generate brake fluid pressure based on a brake operation of a driver. The brake system also comprises an electrical fluid pressure generation device having two second fluid pressure chambers, which respectively communicate with the two first fluid pressure chambers and which generate brake fluid pressure by an electrically controllable actuator. In addition, the brake system comprises a plurality of wheel cylinders respectively communicating with the two second fluid pressure chambers and generating braking forces for braking vehicle wheels, and an ABS provided between the electrical fluid pressure generation device and the plurality of wheel cylinders. In the invention, the ABS is capable of individually controlling the braking forces generated by the plurality of wheel cylinders.

With this arrangement, the two first fluid pressure chambers of the master cylinder respectively communicate with the two second fluid pressure chambers of the electrical fluid pressure generation device, and the two second fluid pressure chambers communicate with the plurality of wheel cylinders. Therefore, the wheel cylinders can be operated by the brake fluid pressure generated by the electrical fluid pressure generation device in a normal situation where the electrical fluid pressure generation device is operatonal, and can be operated by the brake fluid pressure generated by the master cylinder in an abnormal situation where the electrical fluid pressure generation device is non-operational. Further, the ABS controls the braking forces respectively generated by the individual wheel cylinders, while the plurality of wheel cylinders are operated by one electrical fluid pressure generation device, thereby exerting the ABS function. Furthermore, the system includes two separate independent fluid pressure lines, that is, the fluid pressure line from one of the first fluid pressure chambers in the master cylinder to the wheel cylinders via one of the second fluid pressure chambers of the electrical fluid pressure generation device; and the fluid pressure line from the other first liquid pressure chamber of the master cylinder to the wheel cylinders via the other second fluid pressure chambers of the electrical fluid pressure generation device. Therefore, a minimum necessary braking force can be secured even when an abnormality occurs in one of the two fluid pressure lines.

According to a second feature of the present invention, in addition to the first feature, the system further comprises a switch valve provided between the master cylinder and the electrical fluid pressure generation device, the switch valve being closed when the ABS operates.

With this arrangement, the switch valve, which is closed when the ABS operates, is provided between the master cylinder and the electrical fluid pressure generation device, thereby preventing a fluid pressure fluctuation with the operation of the ABS from being transmitted as a kickback from the master cylinder to the brake pedal.

According to a third feature of the present invention, in addition to the first feature, the system further comprises a switch valve provided between the master cylinder and the electrical fluid pressure generation device, the switch valve being closed when regeneration braking is performed.

With this arrangement, the switch valve, which is closed when regeneration braking is performed, is provided between the master cylinder and the electrical fluid pressure generation device, thereby preventing transmission of brake fluid pressure, which is generated by the master cylinder during regeneration braking, to the wheel cylinders to prevent generation of braking force by the fluid pressure.

According to a fourth feature of the present invention, in addition to the first feature, the system further comprises a stroke simulator capable of communicating with one of the two first fluid pressure chambers, and a switch valve provided between the stroke simulator and the one of the first fluid pressure chambers, the switch valve being closed upon power failure.

With this arrangement, the brake system includes the stroke simulator, capable of communicating with one of the two first fluid pressure chambers in the master cylinder, and the switch valve, which is closed in the even of power failure. Therefore, when the power supply is normal and the wheel cylinders are operated by the brake fluid pressure generated by the electrical fluid pressure generation device, the stroke simulator absorbs the brake fluid pressure generated by the master cylinder, thereby generating a pseudo pedal reaction force. When the electrical fluid pressure generation device becomes non-operational due to power failure, the switch valve is closed to make the stroke simulator unable to operate, thereby operating the wheel cylinders by the brake fluid pressure generated by the master cylinder without any problem.

According to a fifth feature of the present invention, in addition to the first feature, the electrical fluid pressure generation device has a first port on the front side communicating with the master cylinder, and a second port on the rear side communicating with the stroke simulator. In addition, a piston of the electrical fluid pressure generation device advances to a position beyond the first port to provide communication between the first port and the second port when the electrical fluid pressure generation device operates, and the piston is positioned between the first port and the second port when the electrical fluid pressure generation device does not operate.

With this arrangement, the piston advances to a position beyond the first port to provide communication between the first port and the second port when the electrical fluid pressure generation device operates, thereby supplying the brake fluid fed out from the master cylinder through the first and second ports to the stroke simulator, whereby a driver can obtain a comfortable brake feeling. Further, the piston is positioned between the first port and the second port when the electrical fluid pressure generation device does not operate, the brake fluid pressure generated by the master cylinder is transmitted to the wheel cylinders without being absorbed by the stroke simulator, whereby the wheel cylinders can be operated without any problem. In this way, the operation or non-operation of the stroke simulator can be selected according to the position of the piston of the electrical fluid pressure generation device, thus eliminating need for the switch valve conventionally provided in the fluid passage communicating with the stroke simulator, and correspondingly reducing the number of parts to contribute to the cost reduction.

According to a sixth feature of the present invention, in addition to the fifth feature, the piston of the electrical fluid pressure generation device advances to the position beyond the first port of the fluid chamber before an intake port of the master cylinder communicating with a reservoir is closed.

With this arrangement, the piston of the electrical fluid pressure generation device advances to the position beyond the first port to provide communication between the first port and the second port before the master cylinder generates the brake fluid pressure. Therefore, it is possible to reliably supply the brake fluid fed out from the master cylinder to the stroke simulator, and further prevent transmission of the brake fluid pressure generated by the master cylinder to the wheel cylinders before the electrical fluid pressure generation device generates the brake fluid pressure.

Shutoff valves 22A and 22B and a reaction force permission valve 25 in embodiments of the present invention correspond to the switch valve in the present invention; a motor cylinder 23 in the embodiments corresponds to the electrical fluid pressure generation device in the present invention; a rear piston 38A and a front piston 39B in the embodiments correspond to the piston in the present invention; a rear fluid chamber 39A and a front fluid chamber 38B in the embodiments correspond to the fluid chambers in the present invention; a front inlet port 40B in the embodiments corresponds to the first port in the present invention; and a front supply port 49B in the embodiments corresponds to the second port in the present invention.

The above-mentioned object, other objects, characteristics, and advantages of the present invention will become apparent from preferred embodiments, which will be described in detail below by reference to the attached drawings.

DESCRIPTION OF THE PREFERRED EMBODIMENTS

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

A first embodiment of the present invention will be described with reference to FIGS. 1 and 2.

Figure 1:
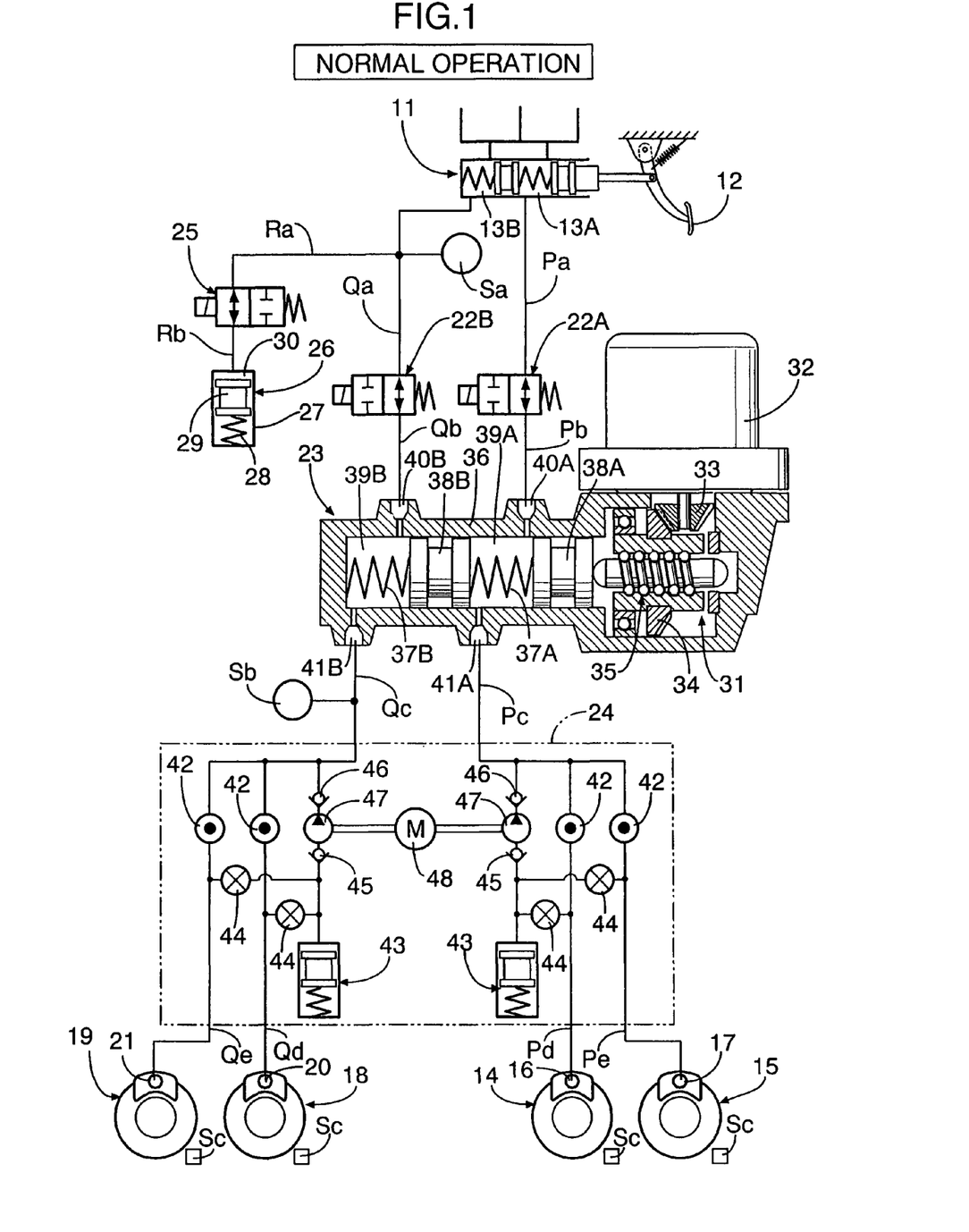
FIG. 1 is a fluid pressure circuit diagram of a vehicle brake system according to a first embodiment of the present invention, showing a configuration for normal operating conditions.

As shown in FIG. 1, a tandem master cylinder 11 has two first fluid pressure chambers 13A and 13B which output brake fluid pressure according to a force applied to a brake pedal 12 by a driver treading on the brake pedal 12. One of the first fluid pressure chambers 13A is connected to wheel cylinders 16 and 17 of disc brake devices 14 and 15 for braking, for example, a left front wheel and a right rear wheel through fluid passages Pa, Pb, Pc, Pd, and Pe. The other first fluid pressure chamber 13B is connected to wheel cylinders 20 and 21 of disc brake devices 18 and 19 for braking, for example, a right front wheel and a left rear wheel through fluid passages Qa, Qb, Qc, Qd, and Qe.

A shutoff valve 22A, which is a normally open solenoid valve, is provided between the fluid passages Pa and Pb. A shutoff valve 22B, which is a normally open solenoid valve, is provided between the fluid passages Qa and Qb. A motor cylinder 23 is provided between the fluid passages Pb, Qb and the fluid passages Pc, Qc. An ABS 24 is provided between the fluid passages Pc, Qc and the fluid passages Pd, Pe; Qd, Qe.

A reaction force permission valve 25, which is a normally closed solenoid valve, is connected between a fluid passage Ra branching from the fluid passage Qa and a fluid passage Rb. A stroke simulator 26 is connected to the fluid passage Rb. The stroke simulator 26 has a cylinder 27 and a piston 29 slidably fitted in the cylinder 27 while being urged by a spring 28. A fluid chamber 30, formed on the side of the piston 29 opposite from the spring 28, communicates with the fluid passage Rb.

An actuator 31 of the motor cylinder 23 has a drive bevel gear 33 provided on the output shaft of an electric motor 32, a follower bevel gear 34 meshing with the drive bevel gear 33, and a ball screw mechanism 35 operated by the follower bevel gear 34. A pair of pistons 38A and 38B urged in a retreat direction by a pair of return springs 37A and 37B are slidably disposed in a cylinder body 36 of the motor cylinder 23. A pair of second fluid pressure chambers 39A and 39B are defined in front of the pistons 38A and 38B. One second fluid pressure chamber 39A communicates with the fluid passages Pb and Pc through ports 40A and 41A. The other second fluid pressure chamber 39B communicates with the fluid passages Qb and Qc through ports 40B and 41B.

When the electric motor 32 is driven in one direction, it advances the pair of pistons 38A and 38B through the drive bevel gear 33, the follower bevel gear 34 and the ball screw mechanism 35, and generates brake fluid pressure in the second fluid pressure chambers 39A and 39B in a moment when the ports 40A and 40B communicating with the fluid passages Pb and Qb are closed, and the brake fluid pressure is output to the fluid passages Pc and Qc through the ports 41A and 41B.

The structure of the ABS 24 is of a well-known type. The ABS 24 has two streams structurally identical to each other: one stream including the disc brake devices 14 and 15 for braking the left front wheel and the right rear wheel; and the other stream for the disc brake devices 18 and 19 for braking the right front wheel and the left rear wheel. Of these streams, the stream for the disc brake devices 14 and 15 will be described as a representative. A pair of in-valves 42 comprising normally open solenoid valves are provided between the fluid passage Pc and the fluid passages Pd, Pe. A pair of out-valves 44 comprising normally closed solenoid valves are provided between the fluid passages Pd, Pe on the downstream side of the in-valves 42 and a reservoir 43. A fluid pressure pump 47 interposed between a pair of check valves 45 and 46 is provided between the reservoir 43 and the fluid passage Pc. The fluid pressure pump 47 is driven by an electric motor 48.

Connected to an electronic control unit (not shown) for controlling the operation of the shutoff valves 22A and 22B, the reaction force permission valve 25, the motor cylinder 23 and the ABS 24, are a fluid pressure sensor Sa for detecting the brake fluid pressure generated by the master cylinder 11, a fluid pressure sensor Sb for detecting the brake fluid pressure transmitted to the disc brake devices 18 and 19, and a vehicle wheel speed sensors Sc for detecting the vehicle wheel speeds of the vehicle wheels.

The operation of the first embodiment of the present invention having the above-described arrangement will now be described.

In a normal situation where the system operates normally, the shutoff valves 22A and 22B, comprising normally open solenoid valves, are de-energized so as to be in an open state, and the reaction force permission valve 25, comprising a normally closed solenoid valve, is demagnetized so as to be in an open state. In this state, when the fluid pressure sensor Sa provided in the fluid passage Qa detects a depression on the brake pedal 12 by the driver, the actuator 31 of the motor cylinder 23 operates to advance the pair of pistons 38A and 38B, thereby generating brake fluid pressure in the pair of second fluid pressure chambers 39A and 39B. This brake fluid pressure is transmitted to the wheel cylinders 16, 17, 20, and 21 of the disc brake devices 14, 15, 18, and 19 through the opened in-valves 42 of the ABS 24, thereby braking the vehicle wheels.

When the pistons 38A and 38B of the motor cylinder 23 slightly advance, the ports 40A and 40B are closed to shut off the communication between the fluid passages Pb, Qb and the second fluid pressure chambers 39A, 39B. Therefore, the brake fluid pressure generated by the master cylinder 11 is not transmitted to the disc brake devices 14, 15, 18, and 19. At this time, the brake fluid pressure generated in the other first fluid pressure chamber 13B of the master cylinder 11 is transmitted to the fluid chamber 30 of the stroke simulator 26 through the opened reaction force permission valve 25 to move the piston 29 against the spring 28, thereby generating a pseudo pedal reaction force while permitting the stroke of the brake pedal 12 to eliminate an uncomfortable feeling to the driver.

The operation of the actuator 31 for the motor cylinder 23 is controlled so that the brake fluid pressure generated by the motor cylinder 23 and detected by the fluid pressure sensor Sb provided in the fluid passage Qc has a value corresponding to the brake fluid pressure generated by the master cylinder 11 and detected by the fluid pressure sensor Sa provided in the fluid passage Qa, thereby generating the braking force in the disc brake devices 14, 15, 18, and 19 according to the depressing force input to the brake pedal 12 by the driver.

If slip ratio of any vehicle wheel is increased and a tendency of locking is detected based on the output from the wheel speed sensor Sc corresponding to the vehicle wheel during the above-described braking, the shutoff valves 22A and 22B, comprising normally open solenoid valves, are energized so as to close, the motor cylinder 23 is maintained in the operating state, and in this state the ABS 24 is operated to prevent locking of the vehicle wheel.

That is, when any vehicle wheel has a tendency of locking, a pressure reducing operation is performed to release the brake fluid pressure in the wheel cylinder by opening the out-valve 44 in a state where the transmission of the brake fluid pressure from the motor cylinder 23 is shut off by closing the in-valve 42 communicating with the wheel cylinder; and a pressure maintaining operation is subsequently performed to maintain the brake fluid pressure in the wheel cylinder by closing the out-valve 44, thereby reducing the braking force to avoid locking of the vehicle wheel.

When the vehicle wheel speed is recovered to reduce the slip ratio, a pressure increasing operation is performed to increase the brake fluid pressure in the wheel cylinder by opening the in-valve 42, thereby increasing the braking force for braking the vehicle wheel. When the vehicle wheel again has a tendency of locking due to this pressure increasing operation, the above-described pressure reducing, maintaining and increasing operation is performed again. The operation is repeatedly performed to generate the maximum braking force while preventing locking of the vehicle wheels. The brake fluid flowing into the reservoir 43 during this process is returned by the fluid pressure pump 47 to the fluid passages Pc and Qc on the upstream side.

During the above-described ABS control, the shutoff valves 22A and 22B are maintained in the valve closed state, thereby preventing a fluid pressure fluctuation associated with the operation of the ABS 24 from being transmitted as a kickback from the master cylinder 11 to the brake pedal 12.

The ABS 24 has the function of individually controlling the braking forces for the four vehicle wheels. Therefore, it is possible to improve the turning performance and straight traveling stability of the vehicle by using the ABS 24 for yaw moment control based on braking force left/right distribution. That is, the turning performance can be improved by increasing the braking force for a turning inner wheel relative to the braking force for a turning outer wheel, and the straight running stability can be improved by increasing the braking force for a turning outer wheel relative to the braking force for a turning inner wheel. During this yaw moment control based on such braking force left/right distribution, if the brake pedal 12 is depressed, the shutoff valves 22A and 22B are closed in order to suppress a kickback due to the operation of the ABS 24. If the brake pedal 12 is not depressed, the shutoff valves 22A and 22B are maintained in the open state because a problem of kickback is not provided.

In a hybrid vehicle or an electric motor vehicle having an electric motor for traveling, a control described below is performed to establish cooperation between pressure braking and regeneration braking. That is, if it is determined that regeneration braking can be performed when the brake pedal 12 is depressed, the operation of the motor cylinder 23 is stopped and regeneration braking is performed with priority over braking by brake fluid pressure, thereby improving the energy recovery efficiency. The ports 40A and 40B of the motor cylinder 23 are open during the regeneration braking, and therefore the shutoff valves 22A and 22B are shifted to the closed state to avoid transmission of the brake fluid pressure generated by the master cylinder 11 to the wheel cylinders 16, 17, 20, and 21.

If any vehicle wheel has a tendency of locking during the regeneration braking, the regeneration control is stopped and ABS control is performed.

As described above, the brake fluid pressure is supplied from the single motor cylinder 23 to the four wheel cylinders 16, 17, 20, and 21, thereby reducing the number of components as compared with the case where motor cylinders are respectively provided in the wheel cylinders 16, 17, 20, and 21; and the ABS 24 provided separately from the motor cylinder 23 exerts the ABS function while individually controlling the braking forces of the four wheel cylinders 16, 17, 20, and 21.

When the motor cylinder 23 becomes inoperable, due to power failure for example, braking by the brake fluid pressure generated by the master cylinder 11 is performed in place of the brake fluid pressure generated by the motor cylinder 23.

Figure 2:
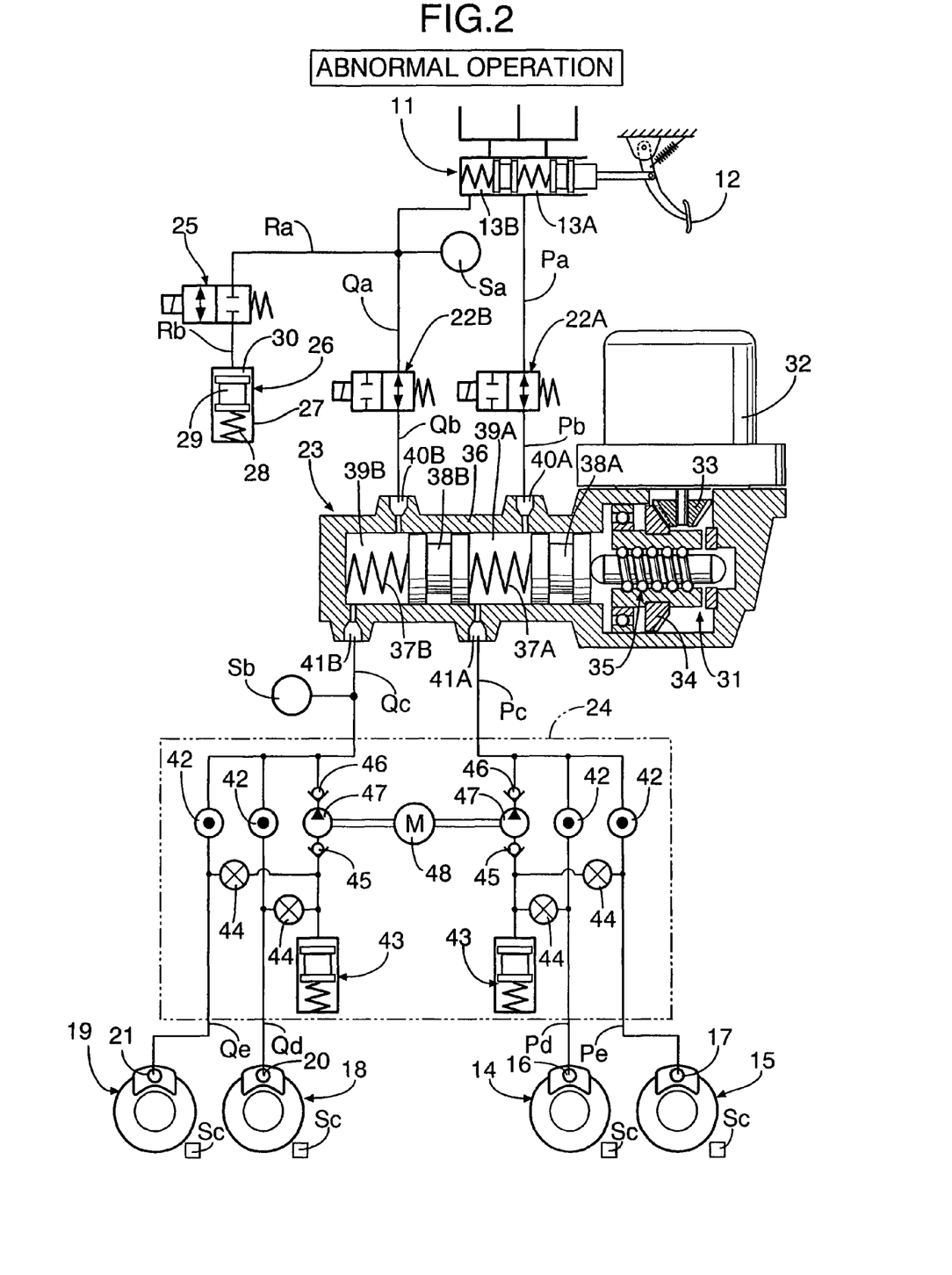
FIG. 2 is the fluid pressure circuit diagram of FIG. 1, showing a configuration for abnormal operating conditions.

In the event of power failure, as shown in FIG. 2, the shutoff valves 22A and 22B, comprising normally open solenoid valves, remain open; the reaction force permission valve 25 comprising a normally closed solenoid valve is automatically closed; the in-valves 42, comprising normally open solenoid valves, are automatically opened; and the out-valves 44, comprising normally closed solenoid valves, are automatically closed. In this state, the brake fluid pressure generated in the first fluid pressure chambers 13A and 13B of the master cylinder 11 passes through the shutoff valves 22A and 22B, the second fluid pressure chambers 39A and 39B of the motor cylinder 23 and the in-valves 42, without being absorbed by the stroke simulator 26; and operates the wheel cylinders 16, 17, 20, and 21 of the disc brake devices 14, 15, 18, and 19 for respectively braking the vehicle wheels, thus generating the braking force without any problem.

The first and second fluid pressure lines are completely separate and independent from each other. That is, the first fluid pressure line extends from one first fluid pressure chamber 13A in the master cylinder 11 to the wheel cylinders 16 and 17 of the disc brake devices 14 and 15 for the left front wheel and the right rear wheel, through the fluid passage Pa, the shutoff valve 22A, the fluid passage Pb, one second fluid pressure chamber 39A of the motor cylinder 23 and the fluid passages Pc, Pd, and Pe; and the second fluid pressure line extends from the other first fluid pressure chamber 13B in the master cylinder 11 to the wheel cylinders 20 and 21 of the disc brake devices 18 and 19 for the right front wheel and the left rear wheel, through the fluid passage Qa, the shutoff valve 22B, the fluid passage Qb, the other second fluid pressure chamber 39B of the motor cylinder 23 and the fluid passages Qc, Qd, and Qe. Therefore, even when trouble such as leakage or clogging of the brake fluid pressure occurs in one of the first and second fluid pressure lines, braking force can be generated in at least two of the four wheels to achieve fail-safe operation of the system.

A second embodiment of the present invention will be described with reference to FIGS. 3 to 6.

Figure 3:
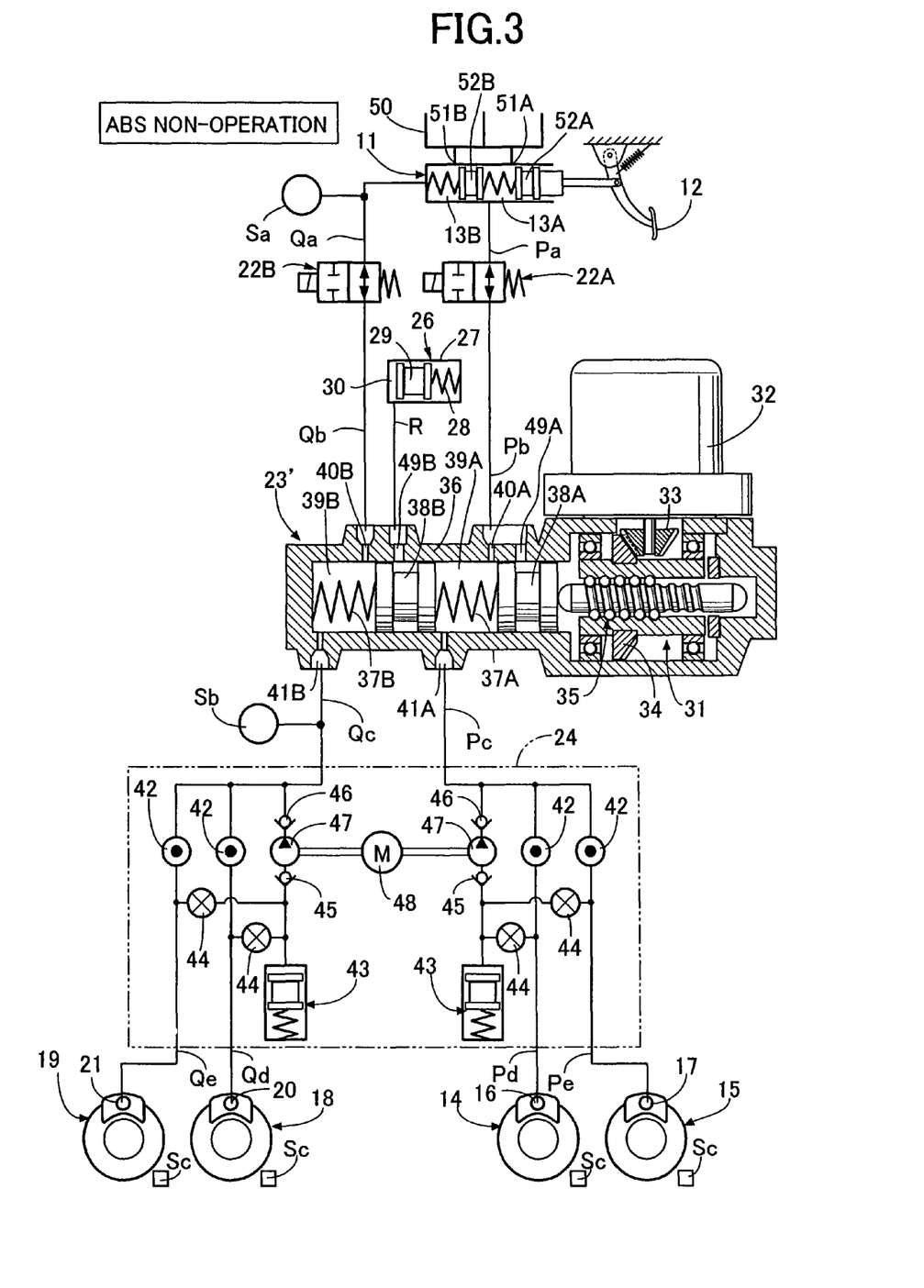
FIG. 3 is a fluid pressure circuit diagram of a vehicle brake system according to a second embodiment of the present invention, showing a configuration for when an ABS does not operate.
Figure 4:
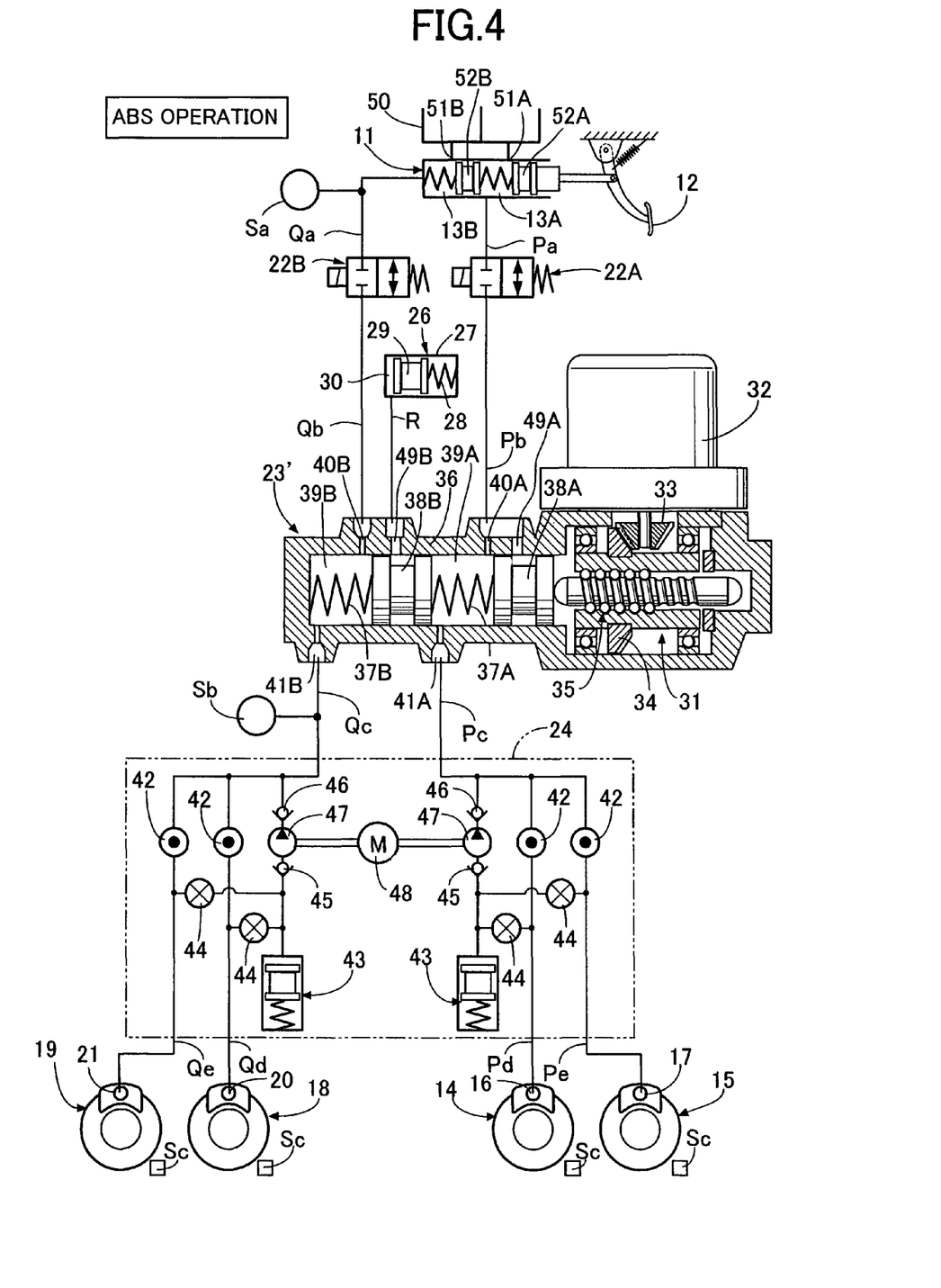
FIG. 4 is the fluid pressure circuit diagram corresponding to FIG. 3, showing a configuration for when the ABS operates.

In the first embodiment, the stroke simulator 26 is connected to the master cylinder 11 via the reaction force permission valve 25, but in the second embodiment the reaction force permission valve 25 is eliminated and the stroke simulator 26 is connected to the motor cylinder 23'. The second embodiment will be described focusing on differences between the second embodiment and the first embodiment. The components of the second embodiment corresponding to those of the first embodiment are denoted by the same reference numerals and symbols, and the overlapping description is omitted.

Figure 5:
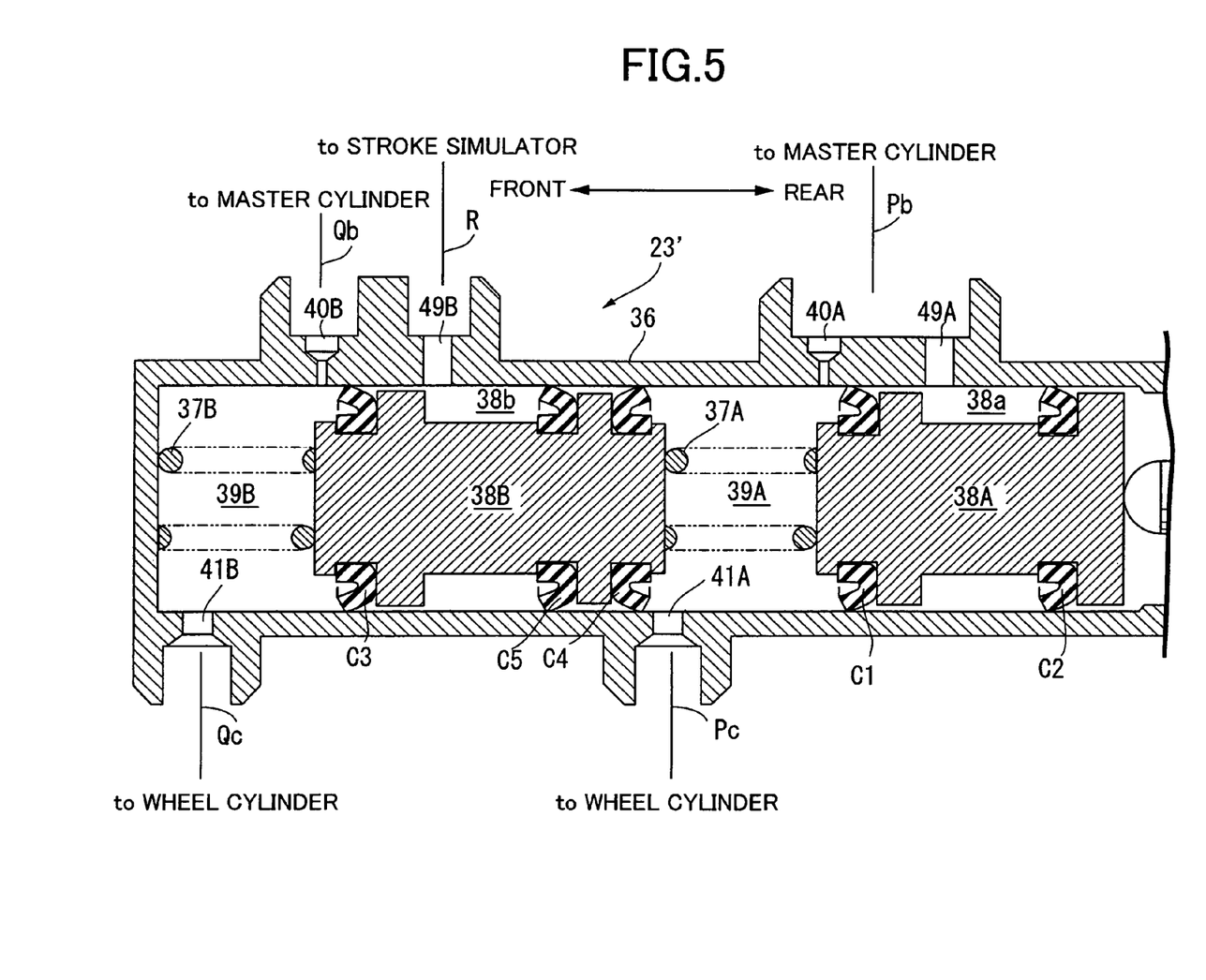
FIG. 5 is an enlarged view of a portion shown in FIG. 3.

As is apparent from FIGS. 3 and 5, a rear fluid chamber 39A of a motor cylinder 23' communicates with fluid passages Pb and Pc through a rear inlet port 40A and a rear outlet port 41A, and a front fluid chamber 39B communicates with fluid passages Qb and Qc through a front inlet port 40B and a front outlet port 41B.

A rear first cup seal C1 is provided at the front end of a rear piston 38A so as to face the front side of the rear piston 38A (so as to exert a sealing function when advancing). A rear second cup seal C2 is provided at the rear end of the rear piston 38A so as to face the front side of the rear piston 38A. A front first cup seal C3 is provided at the front end of a front piston 38B so as to face the front side of the front piston 38B. A front second cup seal C4 is provided at the rear end of the front piston 38B so as to face the rear side of the front piston 38B (so as to exert a sealing function when retreating). A front third cup seal C5 is provided immediately before the front second cup seal C4 so as to face the front side of the front piston 38B.

A rear reservoir chamber 38a is formed in an intermediate portion of the rear piston 38A between the rear first and second cup seals C1 and C2. A rear supply port 49A communicates with the rear reservoir chamber 38a. Each of the rear inlet port 40A and the rear supply port 49A communicates with the one fluid chamber 13A of the master cylinder 11 through the fluid passage Pb.

A front reservoir chamber 38b is formed in an intermediate portion of the front piston 38B between the front first and third cup seals C3 and C5. A front supply port 49B communicates with the front reservoir chamber 38b. The front supply port 49B is independent of the front inlet port 40B, and communicates with the stroke simulator 26 through the fluid passage R. The stroke simulator 26 comprises a cylinder 27 and a piston 29 slidably fitted in the cylinder 27 while being urged by a spring 28. A fluid chamber 30 formed on the side opposite from the spring 28 of the piston 29 communicates with the fluid passage R.

The rear fluid chamber 39A is interposed between the forward-facing rear first cup seal C1 and the rearward-facing front second cup seal C4 so as to secure a fluid-tightness therebetween. Rearward fluid leakage from the rear reservoir chamber 38a of the rear piston 38A is prevented by the forward-facing rear second cup seal C2.

Figure 6:
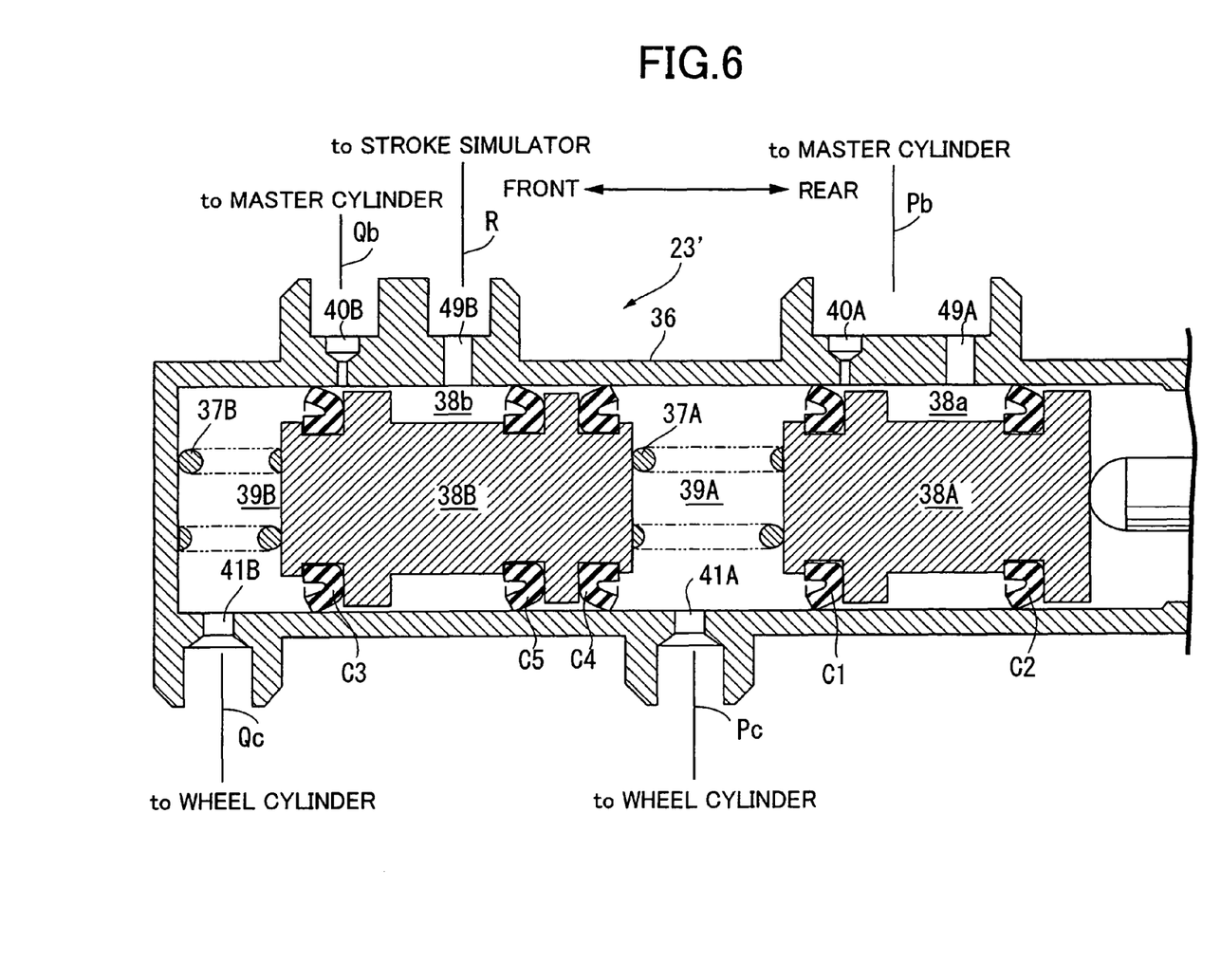
FIG. 6 is a view for explaining the operation corresponding to FIG. 5.

As shown in FIG. 5, the rear first cup seal C1 of the rear piston 38A is positioned immediately at the rear of the rear inlet port 40A when the motor cylinder 23' is not operating. When the rear piston 38A slightly advances, the rear first cup seal C1 moves past the rear inlet port 40A, as shown in FIG. 6, and brake fluid pressure is then generated in the rear fluid chamber 39A. As shown in FIG. 5, the front first cup seal C3 of the front piston 38B is positioned immediately at the rear of the front inlet port 40B when the motor cylinder 23' is not operating. When the front piston 38B slightly advances, the front first cup seal C3 moves past the front inlet port 40B, as shown in FIG. 6, and brake fluid pressure is then generated in the front fluid chamber 39B.

Therefore, when the electric motor 32 is driven in one direction, it advances the rear and front pistons 38A and 38B through the drive bevel gear 33, the follower bevel gear 34 and the ball screw mechanism 35, and generates brake fluid pressure in the rear and front fluid chambers 39A and 39B at a moment when the rear and front inlet ports 40A and 40B communicating with the fluid passages Pb and Qb are closed, and the brake fluid pressure is output to the fluid passages Pc and Qc through the outlet ports 41A and 41B.

The operation of the second embodiment of the present invention having the above-described arrangement will be described.

In a normal situation where the system operates normally, the shutoff valves 22A and 22B, comprising normally open solenoid valves, are de-energized to open, as shown in FIG. 3. In this state, when the fluid pressure sensor Sa provided in the fluid passage Qa detects depression on the brake pedal 12 by the driver, the actuator 31 in the motor cylinder 23' operates to advance the rear and front pistons 38A and 38B, thereby generating brake fluid pressure in the rear and front fluid chambers 39A and 39B. This brake fluid pressure is transmitted to the wheel cylinders 16, 17, 20, and 21 of the disc brake devices 14, 15, 18, and 19 through the opened in-valves 42 of the ABS 24, thereby braking the vehicle wheels.

As shown in FIG. 6, when the front pistons 38A and 38B of the motor cylinder 23' slightly advance, the rear and front inlet ports 40A and 40B are closed to shut off the communication between the fluid passages Pb, Qb and the rear and front fluid chambers 39A, 39B. In this state, therefore, the brake fluid pressure generated by the master cylinder 11 is not transmitted to the disc brake devices 14, 15, 18, and 19.

At this time, the volume of the one fluid chamber 13A of the master cylinder 11 does not change because the fluid chamber 13A communicates with the sealed rear reservoir chamber 38a of the motor cylinder 23'. Therefore, the brake fluid fed out of the other fluid chamber 13B of the master cylinder 11 is supplied to the fluid chamber 30 of the stroke simulator 26 through the fluid passage Qa, the fluid passage Qb, the front inlet port 40B, the front reservoir chamber 38b, the front supply port 49B and the fluid passage R, to move the piston 29 against the spring 28, thereby permitting the stroke of the brake pedal 12 and generating a pseudo pedal reaction force to eliminate an uncomfortable feeling to the driver.

The operation of the actuator 31 for the motor cylinder 23' is controlled so that the brake fluid pressure generated by the motor cylinder 23' and detected by the fluid pressure sensor Sb provided in the fluid passage Qc has a value corresponding to the brake fluid pressure generated by the master cylinder 11 and detected by the fluid pressure sensor Sa provided in the fluid passage Qa, thereby generating the braking force in the disc brake devices 14, 15, 18, and 19 according to the depressing force input to the brake pedal 12 by the driver.

Before the brake fluid pressure is generated in the other fluid chamber 13B of the master cylinder 11 by depression on the brake pedal 12 by the driver, that is, before a piston 52B of the master cylinder 11 moves past an intake port 51B communicating with a reservoir 50, the front first cup seal C3 of the front piston 38B of the motor cylinder 23' advances to a position beyond (forward of) the front inlet port 40B to provide communication between the front inlet port 40B and the front supply port 49B, thus reliably supplying the brake fluid fed out from the master cylinder 11 to the stroke simulator 26 and further preventing the brake fluid pressure generated by the master cylinder 11 from being transmitted to the wheel cylinders 20 and 21 before the motor cylinder 23' generates brake fluid pressure.

When the motor cylinder 23' becomes unable to operate, due to power failure for example, braking by the brake fluid pressure generated by the master cylinder 11 is performed in place of the brake fluid pressure generated by the motor cylinder 23'.

In the event of power failure, the shutoff valves 22A and 22B, comprising normally open solenoid valves, are automatically opened; the in-valves 42 comprising normally open solenoid valves are automatically opened; and the out-valves 44 comprising normally closed solenoid valves are automatically closed. In this state, as shown in FIG. 5, the rear and front pistons 38A and 38B of the motor cylinder 23' are retained at retreating positions, and the front first cup seal C3 of the front piston 38B shuts off the communication between the front inlet port 40B and the front supply port 49B. Therefore, the brake fluid pressure generated in the fluid chambers 13A and 13B of the master cylinder 11 passes through the shutoff valves 22A and 22B, the rear and front fluid chambers 39A and 39B of the motor cylinder 23', and the in-valves 42, without being absorbed by the stroke simulator 26; and operates the wheel cylinders 16, 17, 20, and 21 of the disc brake devices 14, 15, 18, and 19 for respectively braking the vehicle wheels, thus generating the braking force without any problem.

As described above, the operation or non-operation of the stroke simulator 26 can be selected according to the position of the front piston 38B in the motor cylinder 23', thus eliminating need for the reaction force permission valve conventionally provided in the fluid passage communicating with the stroke simulator, and correspondingly reducing the number of parts to contribute to the cost reduction.

The embodiments of the present invention have been described above, but various changes in design may be made without departing from the subject matter of the present invention.

For example, the fluid pressure circuit of the embodiments is provided with the shutoff valves 22A and 22B, but if a kickback during ABS control or yaw control by braking force left/right distribution is allowed, the shutoff valves 22A and 22B can be eliminated to reduce the number of parts to contribute to the cost reduction.

In the second embodiment, the stroke simulator 26 is connected to the front fluid chamber 39B of the motor cylinder 23', but the same effect can be achieved if the stroke simulator 26 is connected to the rear fluid chamber 39A of the motor cylinder 23'.

What is claimed is:

1. A brake system comprising:
a master cylinder having two first fluid pressure chambers in which brake fluid pressure is generated based on a brake operation of a driver;
an electrical fluid pressure generation device comprising:
two second fluid pressure chambers, each second fluid pressure chamber respectively communicating with the two first fluid pressure chambers through respective first fluid passages,
a single electrically controllable actuator common to both second fluid pressure chambers which generates brake fluid pressure in both second fluid pressure chambers;
a cylinder body;
a pair of pistons comprising a first piston and a second piston disposed in series within the cylinder body;
a return spring operatively connected to each piston such that each piston is urged in a retreat direction by its respective return spring;
a first inlet port formed in the cylinder body permitting communication between one of the first fluid passages and one of the second fluid pressure chambers;
a first outlet port formed in the cylinder body permitting communication between the one of the second fluid pressure chambers and one of the second fluid passages;
a second inlet port formed in the cylinder body permitting communication between the other one of the first fluid passages and the other one of the second fluid pressure chambers; and
a second outlet port formed in the cylinder body permitting communication between the other one of the second fluid pressure chambers and the other one of the second fluid passages;
a plurality of wheel cylinders respectively communicating with the two second fluid pressure chambers through respective second fluid passages and generating braking forces for braking vehicle wheels based on fluid pressure generated in the corresponding second fluid pressure chamber; and
an anti-lock brake system (ABS) communicating with the respective second fluid passages between the electrical fluid pressure generation device and the plurality of wheel cylinders, the ABS being capable of individually controlling the braking forces generated by the plurality of wheel cylinders,
wherein a switch valve is provided in each of the first fluid passages between the master cylinder and the electrical fluid pressure generation device;
wherein when the ABS is activated, the switch valves are maintained in a closed state and the electrical fluid pressure generation device is maintained in an operating state;
wherein one of said second fluid chambers is disposed on a forward side of each piston such that when the actuator is driven in one direction, the pistons are moved in an advancing direction and brake fluid pressure is generated in each second fluid pressure chamber,
wherein when the system is operating normally, and in response to fluid pressure generation in the two first fluid pressure chambers, the actuator operates to drive the pistons in the advancing direction, whereby the first inlet port is obstructed by the first piston, the second inlet port is obstructed by the second piston, and fluid pressure generated in the two second fluid pressure chambers is transmitted to the plurality of wheel cylinders via the first and second outlet ports,
wherein when an abnormal operation of the system occurs, and in response to fluid pressure generation in the two first fluid pressure chambers, each of the first piston and second piston are driven in the retreat direction by the respective return spring such that the first inlet port communicates with one of the second fluid pressure chambers, the second inlet port communicates with another one of the second fluid pressure chambers, and fluid pressure generated in the two first fluid pressure chambers is transmitted to the plurality of wheel cylinders via the respective outlet ports, and
wherein when regeneration braking is performed, the operation of electrical fluid pressure generation device is stopped such that the pistons are in a retreated position and the inlet ports are open, and the switch valves are closed such that brake fluid pressure of the master cylinder is not transmitted to the wheel cylinders during regeneration braking.

2. The brake system according to claim 1, wherein the switch valve being closed when regeneration braking is performed.

3. The brake system according to claim 1, further comprising a stroke simulator capable of communicating with one of the two first fluid pressure chambers through a third fluid passage, and a switch valve provided in the third fluid passage between the stroke simulator and the one of the first fluid pressure chambers, the switch valve being closed upon abnormal operation of the brake system.

4. The brake system according to claim 1, wherein the electrical fluid pressure generation device comprises:
a cylinder body having a hollow bore formed therein;
a first piston having first and second spaced-apart annular seal members extending therearound and being reciprocally movable within the hollow bore of the cylinder body;
a first inlet port disposed on a front side of the first annular seal member when the piston is in a resting position, the first inlet port communicating with the master cylinder; and
a simulator supply port disposed on a rear side of the first annular seal member when the piston is in said resting position, the simulator supply port communicating with the stroke simulator;
wherein when the electrical fluid pressure generation device operates, the piston advances to an advanced position where the first annular seal is disposed forward of the first inlet port, to provide fluid communication between the first port and the simulator supply port, whereby said brake fluid pressure is routed from the master cylinder to the stroke simulator via the cylinder body while the piston is in said advanced position.

5. The brake system according to claim 4, wherein the piston of the electrical fluid pressure generation device advances to the position forward of the first inlet port of the fluid chamber before an intake port of the master cylinder, communicating with a reservoir, is closed.

6. The brake system according to claim 1, wherein when ABS is performed, the electrical fluid pressure generation device remains operational such that the pistons are in an advanced position and the inlet ports are closed, and the switch valves are closed such that brake fluid pressure of the master cylinder is not transmitted to the wheel cylinders during regeneration braking.

7. The brake system according to claim 1, wherein the brake system is a brake-by-wire system and further comprises a controller which controls the electrical fluid pressure generation device to generate a brake force on the plurality of wheel cylinders based on a sensed fluid pressure of the master cylinder.

8. The brake system according to claim 1, wherein the plurality of wheel cylinders are used for left and right vehicle wheels and individual control of the braking forces generated by the plurality of wheel cylinders leads to distribution of the braking forces between the left and right vehicle wheels for carrying out yaw moment control.

9. The brake device according to claim 1, wherein if it has been detected that any of the vehicle wheels has locked during regeneration braking, regeneration control is stopped and ABS control is performed.

10. A brake system comprising:
a master cylinder having two first fluid pressure chambers in which brake fluid pressure is generated based on a brake operation of a driver;
an electrical fluid pressure generation device comprising a cylinder body having two second fluid pressure chambers formed therein and a pair of pistons disposed in said cylinder body such that a respective piston is disposed in each of said second fluid pressure chambers, each second fluid pressure chamber respectively communicating with the two first fluid pressure chambers of the master cylinder through respective first fluid passages via respective inlet ports formed in the cylinder body, the electrical fluid pressure generation device having a single electrically controllable actuator common to both second fluid pressure chambers which generates brake fluid pressure in both second fluid pressure chambers;
a plurality of wheel cylinders respectively communicating with the two second fluid pressure chambers through respective second fluid passages via respective outlet ports formed in the cylinder body, wherein each of said outlet ports is disposed forward of a corresponding one of said inlet ports, said wheel cylinders operable to generate braking forces for braking vehicle wheels based on fluid pressure generated in the corresponding second fluid pressure chamber; and
an anti-lock brake system (ABS) communicating with the respective second fluid passages between the electrical fluid pressure generation device and the plurality of wheel cylinders, the ABS being capable of individually controlling the braking forces generated by the plurality of wheel cylinders,
wherein said electrical fluid pressure generation device is configured to operate said wheel cylinders by advancing the pistons in the cylinder body, via action of the actuator, to block fluid flow from the inlet ports into the second fluid pressure chambers while the outlet ports remain in fluid communication with the wheel cylinders,
wherein further forward movement of the pistons generates fluid pressure which is conveyed to said wheel cylinders via said second fluid passages,
wherein a switch valve is provided in each of the first fluid passages between the master cylinder and the electrical fluid pressure generation device such that during normal operation of the brake system, the switch valves are de-energized so as to be in an open state, and such that the switch valves are energized only when wheel locking is detected during ABS operation;
wherein one of said second fluid chambers is disposed on a forward side of each piston such that when the actuator is driven in one direction, the pistons are moved in an advancing direction and brake fluid pressure is generated in each second fluid pressure chamber,
wherein when the system is operating normally, and in response to fluid pressure generation in the two first fluid pressure chambers, the actuator operates to drive the pistons in the advancing direction, whereby each of the inlet ports is obstructed by the piston respectively, and fluid pressure generated in the two second fluid pressure chambers is transmitted to the plurality of wheel cylinders via the outlet ports,
wherein when an abnormal operation of the system occurs, and in response to fluid pressure generation in the two first fluid pressure chambers, each of the pistons are driven in the retreat direction by a return spring such that the inlet ports communicate with the second fluid pressure chambers respectively, and fluid pressure generated in the two first fluid pressure chambers is transmitted to the plurality of wheel cylinders via the respective outlet ports, and
wherein when regeneration braking is performed, the operation of electrical fluid pressure generation device is stopped such that the pistons are in a retreated position and the inlet ports are open, and the switch valves are closed such that brake fluid pressure of the master cylinder is not transmitted to the wheel cylinders during regeneration braking.

\* \* \* \* \*